US012812292B2

(12) United States Patent
Park et al.

(10) Patent No.: US 12,812,292 B2
(45) Date of Patent: Nov. 24, 2026

(54) SPEAKER APPARATUS WITH A SLOT SPEAKER UNIT

(71) Applicant: SAMSUNG ELECTRONICS CO., LTD., Suwon-si (KR)

(72) Inventors: Dongkyu Park, Suwon-si (KR); Seungwan Cho, Suwon-si (KR); Eunbi Kang, Suwon-si (KR); Sungjoo Kim, Suwon-si (KR); Jongbae Kim, Suwon-si (KR); Dongwon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 126 days.

(21) Appl. No.: 19/028,443

(22) Filed: Jan. 17, 2025

(65) Prior Publication Data

US 2025/0287144 A1 Sep. 11, 2025

Related U.S. Application Data

(63) Continuation of application No. PCT/KR2024/020591, filed on Dec. 18, 2024.

(30) Foreign Application Priority Data

Mar. 8, 2024 (KR) ........................ 10-2024-0033492
Jun. 17, 2024 (KR) ........................ 10-2024-0078350

(51) Int. Cl.
*H04R 1/28* (2006.01)
*H04R 1/02* (2006.01)

(52) U.S. Cl.
CPC .......... *H04R 1/2873* (2013.01); *H04R 1/023* (2013.01); *H04R 1/025* (2013.01)

(58) Field of Classification Search
CPC ....... H04R 1/2873; H04R 1/023; H04R 1/025
See application file for complete search history.

(56) References Cited

U.S. PATENT DOCUMENTS 7,151,836 B1 * 12/2006 Funahashi ........... B60R 11/0217 381/337
7,953,461 B2 5/2011 Fukazawa
(Continued)

FOREIGN PATENT DOCUMENTS

JP 4853029 1/2012
KR 10-2008-0063699 7/2008
(Continued)

OTHER PUBLICATIONS

International Search Report and Written Opinion dated Mar. 26, 2025 for International Application No. PCT/KR2024/020591.

*Primary Examiner* — Suhan Ni
(74) *Attorney, Agent, or Firm* — STAAS & HALSEY LLP

(57) ABSTRACT

A speaker apparatus including a housing; a slot loading loudspeaker inside the housing, the slot loading loudspeaker including a speaker unit, and a cover covering the speaker unit, and including an opening through which an acoustic signal from the speaker unit may be output; and a panel member disposed in a forward direction of the slot loading loudspeaker so that a gap is formed between the cover and the panel member, and an exposure area is formed between an edge of the housing and an edge of the panel member to expose the opening through the exposure area so that an acoustic signal outputted through the opening is transferred to an outside, wherein at least one of the cover or the panel member includes at least one blocking member for preventing at least a portion of the acoustic signal outputted through the opening from flowing into the gap.

15 Claims, 13 Drawing Sheets

(56) References Cited

U.S. PATENT DOCUMENTS

| | | | | |
|---|---|---|---|---|
| 8,180,074 | B2 | 5/2012 | Ko et al. | |
| 8,494,186 | B2 | 7/2013 | Lee et al. | |
| 9,307,314 | B2 | 4/2016 | Kim et al. | |
| 9,832,565 | B2 | 11/2017 | Zhang et al. | |
| 10,356,498 | B2 | 7/2019 | Yoon et al. | |
| 11,051,098 | B2 | 6/2021 | Kim et al. | |
| 11,064,290 | B2 | 7/2021 | Son et al. | |
| 11,314,476 | B2 | 4/2022 | Park et al. | |
| 2002/0114481 | A1* | 8/2002 | Watanabe ................ | H04R 1/02 381/334 |
| 2010/0080400 | A1* | 4/2010 | Sibbald .................. | H04R 3/002 381/71.6 |
| 2020/0245062 | A1 | 7/2020 | Son et al. | |
| 2023/0283948 | A1 | 9/2023 | Jung et al. | |

FOREIGN PATENT DOCUMENTS

| | | |
|---|---|---|
| KR | 10-2014-0145068 | 12/2014 |
| KR | 10-1632299 | 6/2016 |
| KR | 10-2017-0098009 | 8/2017 |
| KR | 10-1815843 | 1/2018 |
| KR | 10-2019-0040608 | 4/2019 |
| KR | 10-2020-0084514 | 7/2020 |
| KR | 10-2021-0086133 | 7/2021 |
| KR | 10-2022-0017062 | 2/2022 |
| KR | 10-2402327 | 5/2022 |
| KR | 10-2022-0109861 | 8/2022 |

* cited by examiner

SPEAKER APPARATUS WITH A SLOT SPEAKER UNIT

CROSS-REFERENCE TO RELATED APPLICATIONS

This application is a by-pass continuation application of International Application No. PCT/KR2024/020591, filed on Dec. 18, 2024, which is based on and claims priority to Korean Patent Application No. 10-2024-0033492, filed on Mar. 8, 2024, in the Korean Intellectual Property Office, and Korean Patent Application No. 10-2024-0078350, filed on Jun. 17, 2024, in the Korean Intellectual Property Office, the disclosures of which are incorporated by reference herein in their entireties.

BACKGROUND

1. Field

The disclosure relates to a speaker apparatus with a slot speaker unit.

2. Description of Related Art

A speaker apparatus is a device converting an electrical signal to an acoustic signal and radiating the acoustic signal.

In general, the speaker apparatus includes an enclosure of a box shape having a space therein and a speaker unit generating an acoustic signal as a diaphragm vibrates. The speaker unit may generate an acoustic signal of various ranges of sound and may cover a low frequency to a high frequency.

As an electronic device becomes slimmer, a size of an associated speaker needs to be reduced, and thus a slot loading loudspeaker (SLL) has been developed in which an acoustic signal spinneret is designed in a form of a slot.

Recently, in order to enhance aesthetic sensibility, an electronic device having a form in which a panel for an ornamental purpose is coupled to a front surface of a slot loading loudspeaker has been developed and distributed.

In the case of this electronic device, as part of an acoustic signal outputted through a slot is reflected from a back side or an inside of the panel, interruption may occur to an acoustic signal directly outputted through the slot. Accordingly, there has been a problem that an amplitude spectrum of the acoustic signal is distorted and, as a result, sound quality is lowered.

SUMMARY

Aspects of embodiments of the disclosure will be set forth in part in the description which follows and, in part, will be apparent from the description, or may be learned by practice of the presented embodiments.

According to an embodiment of the disclosure, a speaker apparatus includes a housing; a slot loading loudspeaker disposed inside the housing, the slot loading loudspeaker including a speaker unit, and a cover covering the speaker unit, and including an opening through which an acoustic signal generated from the speaker unit is output; and a panel member disposed in a forward direction of the slot loading loudspeaker so that a gap is formed between the cover and the panel member, and an exposure area is formed between an edge of the housing and an edge of the panel member to expose the opening through the exposure area so that the acoustic signal outputted through the opening is transferred to an outside, wherein at least one of the cover or the panel member includes at least one blocking member for preventing at least a portion of the acoustic signal outputted through the opening from flowing into an inside of the gap.

According to an embodiment of the disclosure, the at least one blocking member may be a protruding portion of a surface of, and may be formed of a same material as, the cover. The at least one blocking member may protrude from the surface of, and may be formed of a different material from, the cover.

According to an embodiment of the disclosure, the at least one blocking member may protrude in a direction of the panel member. The at least one blocking member may not contact the panel member.

According to an embodiment of the disclosure, the at least one blocking member may be a protruding portion of a rear surface of, and may be formed of a same material as, the panel member. The at least one blocking member may protrude from the rear surface of, and may be formed of a different material from, the panel member.

According to an embodiment of the disclosure, the at least one blocking member may be disposed on a rear surface of the panel member, and may protrude in a direction of the cover. The at least one blocking member may not contact the cover.

According to an embodiment of the disclosure, the speaker apparatus may further include an auxiliary member in a space between the cover and the panel member.

According to an embodiment of the disclosure, the auxiliary member may be an acoustic meta material (AMM).

According to an embodiment of the disclosure, the at least one blocking member may include a first blocking member disposed on all of a surface of the cover, and a second blocking member disposed on all of a rear surface of the panel member. The first blocking member may be formed of a different material from, or a same material integrated with, the cover. The second blocking member may be formed of a different material from, or a same material integrated with, the panel member.

According to an embodiment of the disclosure, the at least one blocking member may include a first blocking member protruding from a front surface of the cover, and a second blocking member protruding from a rear surface of the panel member. The first blocking member may not contact the second blocking member.

According to an embodiment of the disclosure, the speaker apparatus may further include an auxiliary member between the first blocking member and the second blocking member.

According to an embodiment of the disclosure, the auxiliary member may be an acoustic meta material (AMM).

According to an embodiment of the disclosure, the at least one blocking member may include a plurality of blocking members disposed on at least one of a front surface of the housing or a rear surface of the panel member.

According to an embodiment of the disclosure, the speaker apparatus may further include an auxiliary member disposed on a front surface of the cover and a rear surface of the panel member.

According to an embodiment of the disclosure, the at least one blocking member may have a convex dome shape.

According to an embodiment of the disclosure, the speaker apparatus may further include an auxiliary speaker unit and a rear speaker unit. The auxiliary speaker unit may be disposed at both sides of a front of the housing. The rear speaker unit may be disposed on a rear surface of the housing so as to be symmetrical about a center line of the rear surface of the housing.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
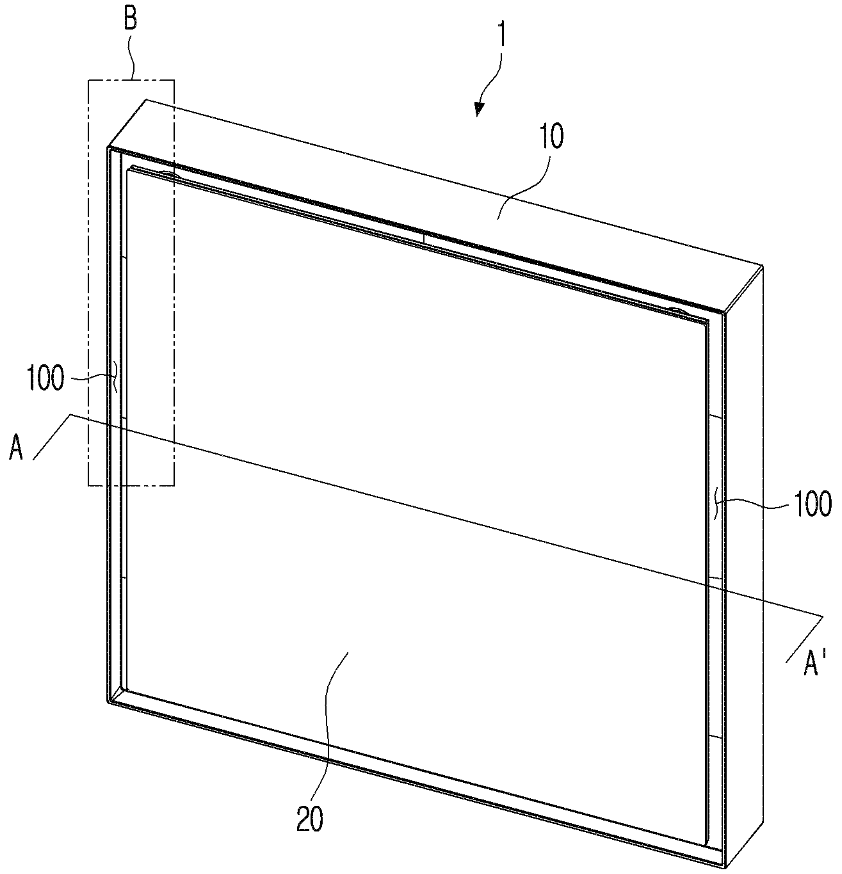
FIG. 1 is a perspective view of a speaker apparatus according to at least one embodiment of the disclosure.

It should be understood that embodiments described hereinafter are exemplarily illustrated for understanding of the disclosure and the disclosure may be variously modified and implemented in a different method from the embodiments described herein. Meanwhile, in describing the disclosure hereinafter, if it is determined that the detailed description of the related known function or component may unnecessarily make the gist of the disclosure vague, the detailed description and specific illustration are omitted. Also, the appended drawings may not be illustrated in a real scale but a dimension of a partial component may be exaggeratedly illustrated for understanding of the disclosure.

The terms used in the specification and the scope of claims are selected as general terms in consideration of functions of the disclosure. However, these terms may be varied according to an intention of those skilled in the art, a legal or technical interpretation, appearance of new technologies, or the like. Also, some terms are arbitrarily selected by the applicant. This term may be interpreted as a defined meaning in the specification and if there is a specific definition of the term, the term may be interpreted based on the entire content of the specification and general technical knowledge in the technical field.

In describing the disclosure, if the preceding step or operation does not necessarily need to be logically and sequentially performed before the following step, an order of each step should be understood to not be limited to the order described herein. That is, excluding the exceptional case above, even if a process described as the following step is performed prior to a process described as the preceding step, it does not affect essence of the disclosure and the scope of a right should be also defined regardless of orders of steps.

In the specification, the expression "have," "may have," "include" or "may include" denotes the existence of such characteristic (e.g., a numerical value, a function, an operation, or a component such as a part), and does not exclude the existence of additional characteristics.

The term "first", "second", or the like may be used to describe various components but the components should not be limited by the term. The term may be used only for the purpose of distinguishing one component from another component. For example, a first component may be referred to as a second component and similarly, the second component may be also referred to as the first component without departing from the scope of the right of the disclosure.

Also, the term "front surface", "rear surface", "upper surface", "lower surface", "side surface", "left side", "right side", "upper part", "lower part", or the like is not defined based on the drawings and a shape and a position of each component is not limited by the relevant term.

Further, in the disclosure, components required for describing each embodiment of the disclosure are described and thus the disclosure is not limited thereto. Therefore, some components may be changed or omitted and another component may be added. Also, the components may be distributed and disposed in different independent devices.

Furthermore, with respect to the description of the drawings, a similar or related component may be designated by a similar reference numeral.

A singular form of a noun corresponding to an item may include one item or a plurality of items unless explicitly differently indicated in the related context.

In the disclosure, each of the phrases such as "A or B", "at least one of A and B", "at least one of A or B", 'A, B, or C", "at least one of A, B, and C", and "at least one of A, B, or C" may include any one of items enumerated together with the relevant phrase among the phrases or all possible combinations thereof.

The term "and/or" includes a combination of a plurality of related and described components or any component of the plurality of related and described components.

The term such as "1st", "2nd", "first", or "second" may be used to simply distinguish one component from another component and is not intended to limit the relevant component in regard of a different aspect (e.g., importance or an order).

The description that one element (e.g., a first component) is "coupled with/to" or "connected to" another element (e.g., a second component) "operatively" or "communicatively" or without the relevant term should be interpreted such that the one element may be connected to the another element directly (wiredly), wirelessly, or through a third component.

Term "include" or "have" should be construed as designating that there is a characteristic, a number, a step, an operation, a component, a part, or a combination thereof described in the disclosure but not as excluding in advance the existence or possibility of adding one or more other characteristics, numbers, steps, operations, components, parts, or a combination thereof.

When it is described that one element "is connected to", "is coupled to", "is supported by", or "contacts" another element, the description includes not only a case that the element is connected to, is coupled to, is supported by, or contacts another element directly but also a case that the element is connected to, is coupled to, is supported by, or contacts another element indirectly through a third element.

When it is described that one element is positioned "on" another element, the description includes not only a case that the element contacts another element but also a case that the other element is present between two elements.

Hereinafter, with reference to the appended drawings, a speaker apparatus according to various embodiments is specifically described.

FIG. 1 is a perspective view of a speaker apparatus according to an embodiment. With reference to FIG. 1, a speaker apparatus 1 may include a housing 10, a panel member 20, etc.

The housing 10 designates a body of the speaker apparatus 1. The housing 10 may be differently described as various terms such as packaging, a box, and a body.

The housing 10 includes various electronic devices, a battery, or the like disposed therein and has a role for protecting these devices. The housing 10 may be implemented in various forms such as a stand form for standing it on a bottom, a wall-mountable form, and a form for hanging down from a ceiling through a line.

In FIG. 1, the housing 10 implemented in a square shape is illustrated but is not limited thereto and may have various shapes such as a circular shape and a polygonal shape.

The panel member 20 may be formed on a front surface of the housing 10.

The panel member 20 may be made of various materials such as plastic materials of PVC, acrylic, polycarbonate, or the like, glass materials, rubber materials, wood materials, and metal materials.

The panel member 20 may be implemented in a form detachable from the housing 10. A picture may be drawn on the front surface of the panel member 20 or a display may be included therein and thus an image may be displayed. Accordingly, a user may use the speaker apparatus 1 to which the panel member 20 is attached like a picture frame. If the panel member 20 is designed like the picture frame, the user may replace it at pleasure according to the user's preference. If the panel member 20 includes the display, the user may change an image to be displayed at pleasure according to the user's preference. The change of the image may be transferred to the panel member 20 or the speaker unit by using portable memory such as USB stick memory or may be transferred thereto through a hand phone, a tablet, a PC, a laptop PC, or the like wirelessly or wiredly connected to the panel member 20 or the speaker unit. Otherwise, it may be downloaded through a server device.

If the panel member 20 is attached to the front surface, it may be a structure that it is difficult to output an acoustic signal in a direction of the front surface of the speaker apparatus 1. If the speaker unit is formed in the direction of the front surface of the speaker apparatus 1, the panel member 20 covers a front, or forward, side thereof and thus part of the speaker unit is hidden. Accordingly, a thickness of the panel member 20 may be made to be thin in order that an acoustic signal radiated from the speak unit is well transferred to an outside.

According to at least one embodiment of the disclosure, the panel member 20 may be disposed apart at a position in which an opening is not hidden on a front side of a slot loading loudspeaker. Also, an exposure area 100 may be formed between an edge of the housing 10 and an edge of the panel member to transfer an acoustic signal outputted from the opening to the outside.

The exposure area 100 may be differently referred to as various expressions such as a boundary area, a disclosed area, a penetration area, and a gap area.

Meanwhile, according to at least one embodiment of the disclosure, the panel member 20 is connected in a criterion of a center of the speaker apparatus 1, i.e., a center of the housing 10. If an area of the panel member 20 is smaller than an area of the housing 10, at least one edge of an upper edge, a lower edge, a left edge, or a right edge may be exposed. FIG. 1 illustrates a case that all of the upper, lower, left, and right edges are the exposure area 100. The slot loading loudspeaker may be disposed at a rear or back side of the exposure area 100. Specifically, the opening for transferring the acoustic signal radiated from the slot loading loudspeaker to the outside is disposed at a rear surface of the exposure area 100. Accordingly, even if part of the speaker unit is hidden by the panel member 20, the acoustic signal may be well transferred to the user through the opening formed in the exposure area 100 which is not hidden by the panel member 20.

In FIG. 1, a gap may be necessarily formed between the housing 10 and the panel member 20.

In the case of a conventional speaker apparatus, even if the opening is disposed on the exposure area 100, part of the acoustic signal outputted through the opening may flow into an inside of the gap. As the inflow acoustic signal is transferred to the inside of the gap, is reflected, and then exists, an acoustic signal directly radiated from the speaker unit and an acoustic signal indirectly radiated therefrom are constructed and/or destructed and thus there may be problems that an amplitude spectrum of an acoustic signal may be distorted and sound quality is lowered.

Specifically, if an acoustic signal directly outputted and an acoustic signal reflected from the inside of the gap meet in the same phase or an aligned phase, constructive interference occurs and on the contrary, if they meet in an opposite phase, destructive interference occurs.

If the constructive interference occurs, an amplitude of an individual acoustic signal is added and thus an acoustic signal having an amplitude larger than that of a volume set by the user is transferred and if the destructive interference occurs, a volume of an acoustic signal may be lowered or almost disappeared.

Figure 2:
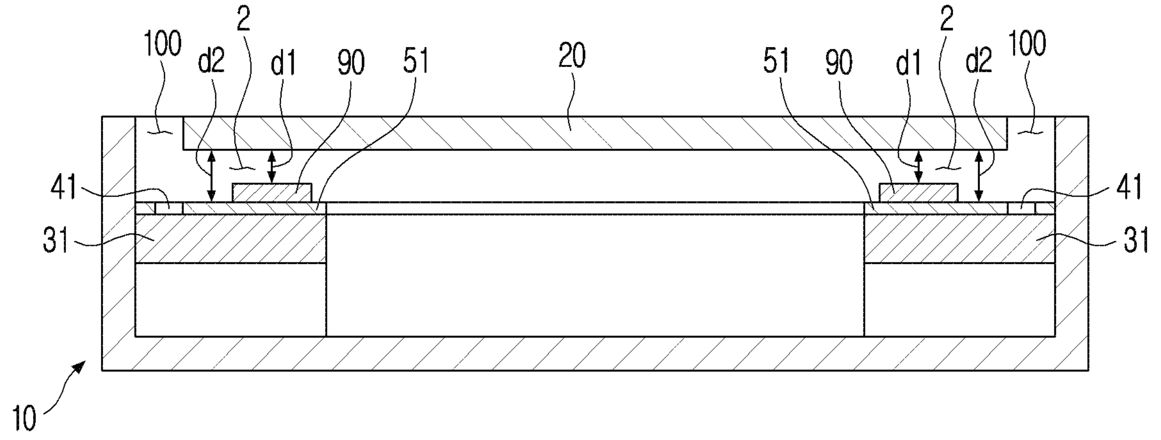
FIG. 2 is a schematic diagram of a sectional configuration of a speaker apparatus according to at least one embodiment of FIG. 1.

FIG. 2 is a schematic diagram of a sectional configuration of a speaker apparatus 1 according to various embodiments.

According to FIG. 2, the speaker apparatus 1 includes a housing 10, a slot loading loudspeaker and a panel member 20 which are disposed inside of the housing.

The slot loading loudspeaker is specially designed audio equipment and is a speaker having a method of emitting sound through a narrow slot, i.e., an opening 41. Mainly, orientation of sound may be delicately controlled and sound quality may be improved in a specific frequency band. Also, an acoustic design may be optimized and utilization of a space may be enhanced by using a narrow slot and reducing a size of a speaker itself.

According to FIG. 2, it is illustrated that two slot loading loudspeakers are disposed to be symmetrical at edges of both sides of the housing 10. Meanwhile, the disclosure is not limited thereto and only one slot loading loudspeaker may be disposed at one side or a plurality of slot loading loudspeakers rather than one may be disposed at both sides.

The slot loading loudspeaker may be configured of a speaker unit 31, an opening 41, a cover 51, or the like. The opening 41 is formed to penetrate the cover 51 and may output an acoustic signal generated from the speaker unit 31. In the case of using the slot loading loudspeaker, even if the panel member 20 is coupled to the front of the housing 10, the acoustic signal may be output through the exposure area between the panel member 20 and the housing 10.

With reference to FIGS. 1 and 2, it is illustrated that the exposure area 100 is formed between the edge of the panel member 20 and the edge of the housing 10 but it may be differently varied depending on a connection position, a shape, or the like of the panel member 20. For example, the exposure area may be formed in a center part or other inside areas rather than surroundings of the edge of the housing 10. The panel member 20 may be disposed at a proper position in order that the exposure area does not hide the acoustic signal outputted through the opening 41. FIGS. 1 and 2 illustrate that the opening 41 is disposed at the surroundings of the edge of the housing 10 and the exposure area 100 is formed at the front side of the opening 41.

The panel member 20 is disposed apart from at a position in which the opening 41 is not hidden at the front side of the slot loading loudspeaker and thus a gap is formed between the cover 51 and the panel member 20. At least one part of the acoustic signal outputted through the opening 41 may flow into an inside of the gap. Accordingly, according to at least one embodiment of the disclosure, the speaker apparatus 1 includes at least one blocking member 90 for preventing the acoustic signal from flowing into the inside of the gap. In the disclosure, the blocking should be interpreted as a meaning of not only completely preventing the inflow but also minimizing a ratio of the inflow. The blocking member 90 may be manufactured in various forms according to various embodiments of the disclosure. The blocking member 90 may be formed on at least one of the cover 51 or the panel member 20 but may be formed on various components besides.

FIG. 2 illustrates that the blocking member 90 is formed on a surface of the cover 51. The blocking member 90 may have a structure of being integrated with the cover 51 in the same material and may also have a structure of being separately manufactured in a different material from that of the cover 51 and being attached or coupled thereto.

The blocking member 90 may be manufactured in a form for reducing a size of the gap. According to an embodiment of the disclosure, the blocking member 90 may be provided in a form of protruding in a direction of the panel member 20. Here, the blocking member 90 may be provided in a form of contacting the panel member and may also be provided in a form of not contacting the panel member.

In FIG. 2, according to an embodiment of the disclosure, a width d1 between the panel member 20 and the blocking member 90 may be narrower than a width d2 between the panel member 20 and the cover 51. That is, it may be $0<d1<d2$. Due to the above, indirect reflected sound reflected after sound emitted from the opening 41 flows into the inside of the gap may be minimized or removed and thus sound quality may be enhanced.

In FIG. 2, according to an embodiment of the disclosure, the blocking member 90 may have a shape of a cuboid.

In FIG. 2, according to an embodiment of the disclosure, the blocking member 90 may have a convex dome shape. Meanwhile, the disclosure is not limited thereto and it may have various shapes such as a pyramid shape.

In FIG. 2, according to an embodiment of the disclosure, the exposure area 100 may be formed between the edge of the housing 10 and the edge of the panel member 20 to transfer an acoustic signal outputted from the opening 41 to the outside. Also, at least one of the cover 51 or the panel member 20 may include at least one blocking member 90 for preventing an acoustic signal outputted through the opening 41 from flowing into an inside of the gap 2.

In FIG. 2, according to an embodiment of the disclosure, the opening 41 is formed to penetrate the cover 51 and may output an acoustic signal generated from the speaker unit 31.

In FIG. 2, according to an embodiment of the disclosure, an auxiliary member (not shown) may be further included on the at least one surface of the panel member 20, the cover 51, or the blocking member 90. Here, the auxiliary member (not shown) may be an acoustic meta material (AMM). Meanwhile, the disclosure is not limited thereto and the auxiliary member (not shown) may be made of various different materials.

Figure 3:
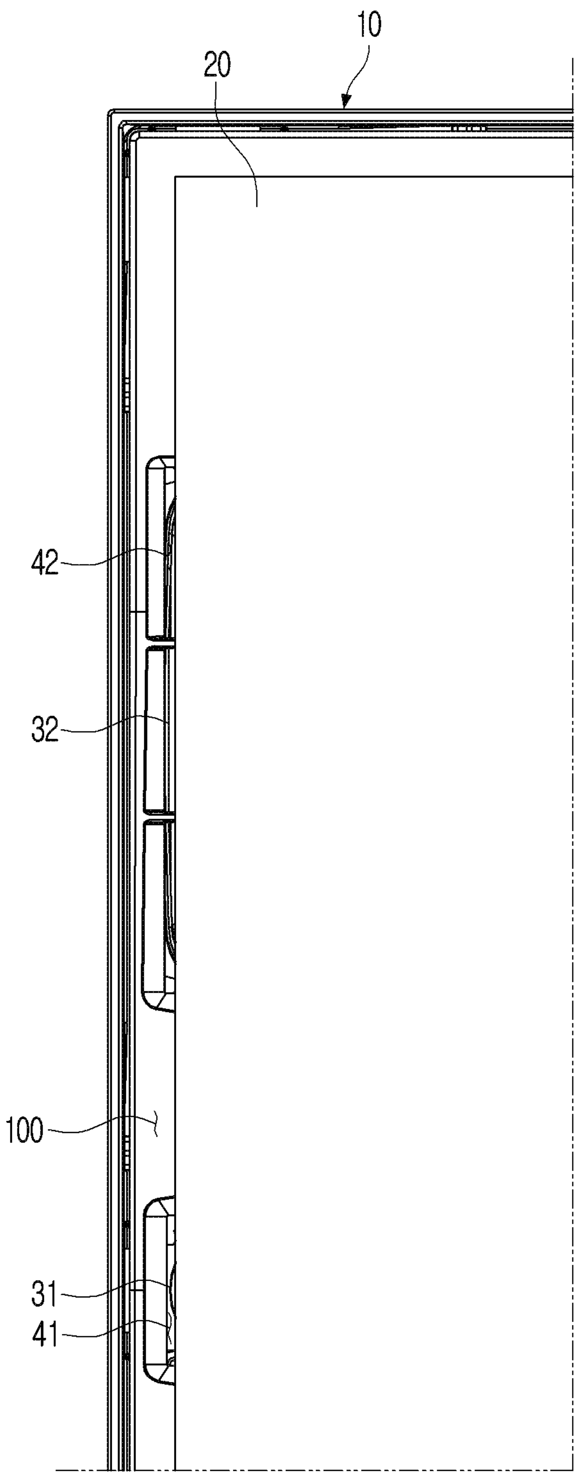
FIG. 3 is a view enlarging a part 'B' of FIG. 1.

FIG. 3 is a view enlarging a part 'B' of FIG. 1.

FIG. 3 illustrates a state that the panel member 20 is coupled to the housing 10 as enlarged. FIG. 3 illustrates that two slot loading loudspeakers are disposed at edge areas of a left side and two speaker units 31, 32 are disposed inside two slot loading loudspeakers. For convenience of the description, one of them is referred to as a first speaker unit 31 and the other one is referred to as a second speaker unit 32 hereinafter. Meanwhile, the disclosure is not limited thereto and the first speaker unit 31 may be referred to as a speaker unit or a main speaker unit and the second speaker unit 32 may be referred to as an additional speaker unit or an auxiliary speaker unit. All of two speaker units 31, 32 may be implemented as a slot speaker unit outputting an acoustic signal through an opening. For convenience of the description, an opening of the first speaker unit 31 is referred to as a first opening 41 and an opening of the second speaker unit 32 is referred to as a second opening 42.

Meanwhile, the openings 41, 42 are not limited to these expressions and may be replaced with various expressions such as a slot, a hole, a gap, a radiating area, and an acoustic emission part.

In FIG. 3, the first opening 41 is formed on a front surface of the first speaker unit 31.

In FIG. 3, a size of the panel member 20 may be configured to be smaller than a size of the front surface of the housing 10. Accordingly, if the panel member 20 is coupled to the housing 10 in a criterion of a center of the housing, the exposure area 100 may be configured between the housing 10 and the panel member 20.

In FIG. 3, according to an embodiment of the disclosure, a shape of the panel member 20 may be implemented in a square shape to be identical to a shape of the housing 10.

Meanwhile, the disclosure is not necessarily limited thereto and according to another embodiment, a length and a ratio of a width and a height of the panel member 20 are formed to be identical to a length and a ratio of a width and a height of the housing 10, wherein it may be implemented that when coupling, they are coupled in a rotation state at a certain angle to exposure part of the housing 10. Otherwise, it may be implemented that they are identically aligned and coupled, wherein part of the panel member 20 is implemented in a cut form to expose part of the housing 10 (e.g. a corner).

In FIG. 3, part of the acoustic signal emitted from the first speaker unit 31 may be directly emitted through the first opening 41 and the exposure area 100.

Another part of the acoustic signal emitted through the first opening 41 may be emitted to the inside of the gap between the panel member 20 and the housing 10 rather than the exposure area 100.

Here, the acoustic signal emitted to the inside of the gap may be reflected and come back from a rear surface of the panel member 20 and/or an inner surface of the housing 10.

The acoustic signal reflected and come back may result in interference with an acoustic signal directly emitted through the first opening 41 and the exposure area 100.

Through the above, the acoustic signals may be constructed and/or destructed to each other and sound quality may be lowered.

According to various embodiments of the disclosure, it is implemented that a gap between the speaker unit and the panel member may be variously modified and the gap may be varied according to a distance between the cover and the panel member 20. According to the above, the acoustic signal emitted from the speaker unit is prevented from being deeply transferred to the inside of the gap, thereby greatly reducing a ratio of construction/destruction with the acoustic signal directly emitted through the opening.

Figure 4:
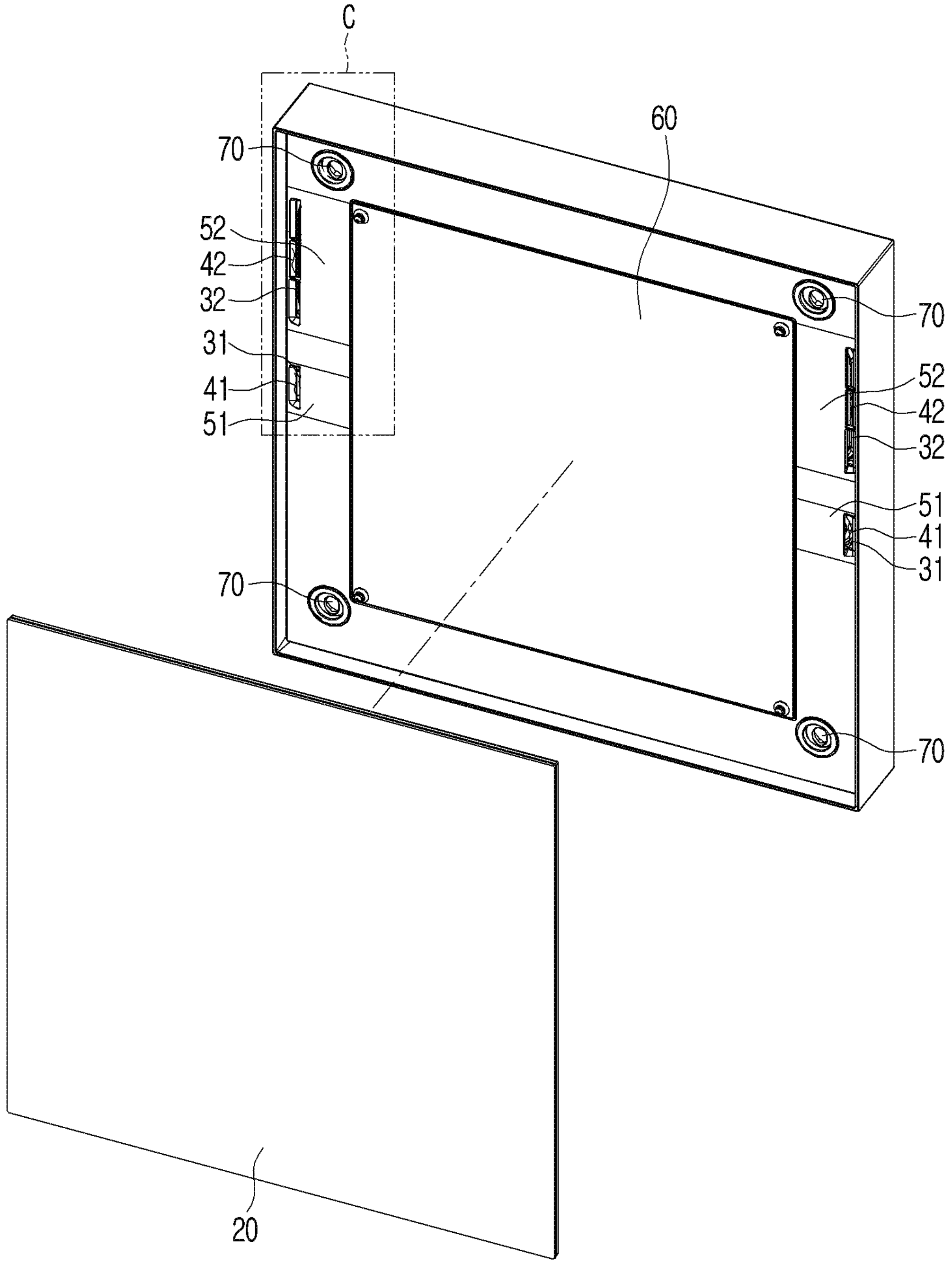
FIG. 4 is an exploded perspective view of a speaker apparatus according to at least one embodiment of the disclosure.

FIG. 4 is an exploded perspective view illustrating a state that the housing 10 and the panel member 20 are detached in the perspective view of FIG. 1.

Based on FIG. 4, a configuration of the housing 10 may be more specifically known.

The cover 51 is a component covering the first speaker unit 31. The first cover 51 forms a forward surface of the first speaker unit 31. The first opening 41 is formed on the first cover 51.

Also, the second cover 52 is a component covering the second speaker unit 32. The second opening 42 may be formed on the second cover 52. The second opening 42 may be implemented in a form of a plurality of slots into which one opening is divided by at least one partition wall differently from the first opening 41. FIG. 3 illustrates a state that the second opening 42 is divided into three openings.

In FIG. 4, it is illustrated that a size of the second speaker unit 32 is larger than a size of the first speaker unit 31 and a size of the second cover 52 is larger than a size of the first cover 51 but the disclosure is not limited thereto, wherein the first and second speaker units 31, 32 may be implemented in the same size.

Also, in FIG. 4, it is illustrated that a plurality of first speaker units 31 are provided to each of a center part of an edge of a left side and a center part of an edge of a right side among an upper edge, a lower edge, a left edge, and a right edge of the housing 10, and a plurality of second speaker units 32 are disposed at a position (in the case of FIG. 3, an upper side) spaced apart from the first speaker unit 31 along the edge of the left side and the edge of the right side of the housing, but the number, a disposed position, a size, a shape, or the like of the first and second speaker units 31, 32 may be variously changed.

The first speaker unit 31 and the second speaker unit 32 may be implemented in a different speaker form, respectively.

For example, the first speaker unit 31 may be a mid-range speaker taking charge of a middle sound range, and the second speaker unit 32 may be a tweeter speaker taking charge of a high frequency sound range.

According to another embodiment, the first speaker unit 31 may be a tweeter speaker taking charge of a high frequency sound range, and the second speaker unit 32 may be a mid-range speaker taking charge of a middle sound range.

According to another embodiment, the speaker unit 31 and the speaker unit 32 may be configured of at least one of a tweeter, a mid-range speaker, or a woofer.

The first and second speaker units 31 and 32 are to be positioned at a rear side of the panel member 20 and thus if an acoustic signal is output as it is, the acoustic signal is not well transferred by the panel member 20 to the outside. For preventing the above, the covers 51, 52 including the openings 41, 42 outputting an acoustic signal radiated from the first and second speaker units 31 and 32 to the outside through the exposure area 100 are provided. Through the first cover 51 and/or the second cover 52, sound quality of a low pitched acoustic signal outputted from the speaker apparatus 1 may be enhanced, and an undesired noise or distortion may be reduced.

Also, through the first cover 51 and/or the second cover 52, the speaker apparatus 1 has an effect of accurately replaying sound even at a lower frequency.

Also, through the first cover 51 and/or the second cover 52, the speaker apparatus 1 may expand a frequency range and efficiently transfer sound.

Also, through the first cover 51 and/or the second cover 52, the speaker units 31, 32 may be disposed inside an electronic product (e.g., the housing 10), and thus a space may be efficiently used.

A material of the cover 51 and/or the second cover 52 may be varied according to a purpose. Specifically, it may be configured of various materials such as plastic, metal, wood, and fabric.

Here, a plastic material is light and its processing is easy. Metal is excellent in respect to durability and may less affect quality of sound. Wood may be used for a case that a design is important. Fabric is good in respect to acoustic permeability and thus the speaker unit may be protected while quality of sound is not damaged.

A fastening part 70 may be formed inside each edge of the front surface of the housing 10, and a plate film 60 may be formed in a center of the front surface of the housing 10.

The fastening part 70 is a component provided for attaching and/or detaching the panel member 20 to the housing 10. Through the above, the panel member 20 may be coupled or separated.

According to an embodiment of the disclosure, the fastening part 70 may be configured in a circular groove or an uneven structure. Meanwhile, the disclosure is not limited thereto and the fastening part 70 may be configured in a polygonal groove and may be configured in a form such as a magnet.

According to an embodiment of the disclosure, the fastening part 70 may be disposed one by one at each edge on the front surface of the housing 10.

A fastening member (not shown) may be formed at each edge on the rear surface of the panel member 20. The fastening member may be provided in a protruding structure or an uneven structure. The fastening member (not shown) may be formed in a protruding structure, and if the fastening part 70 is formed as a groove, the fastening member may be fastened in a form inserted into the fastening part 70. Through the coupling of the fastening member (not shown), the panel member 20 may be fixed to the housing 10.

In the drawings, it is not illustrated but is possible that the fastening part 70 is configured as one in a center part of the plate film 60 according to another embodiment. For example, the fastening part 70 may be configured in a circular groove in the center part of the plate film 60 and may attach the fastening member (not shown) to the low surface of the panel member 20. Through the above, the panel member 20 may couple and fix the fastening member (not shown) to the fastening part 70.

The fastening member (not shown) and the fastening part 70 may be implemented in a form including a magnet or the like for magnetic coupling.

Figure 5:
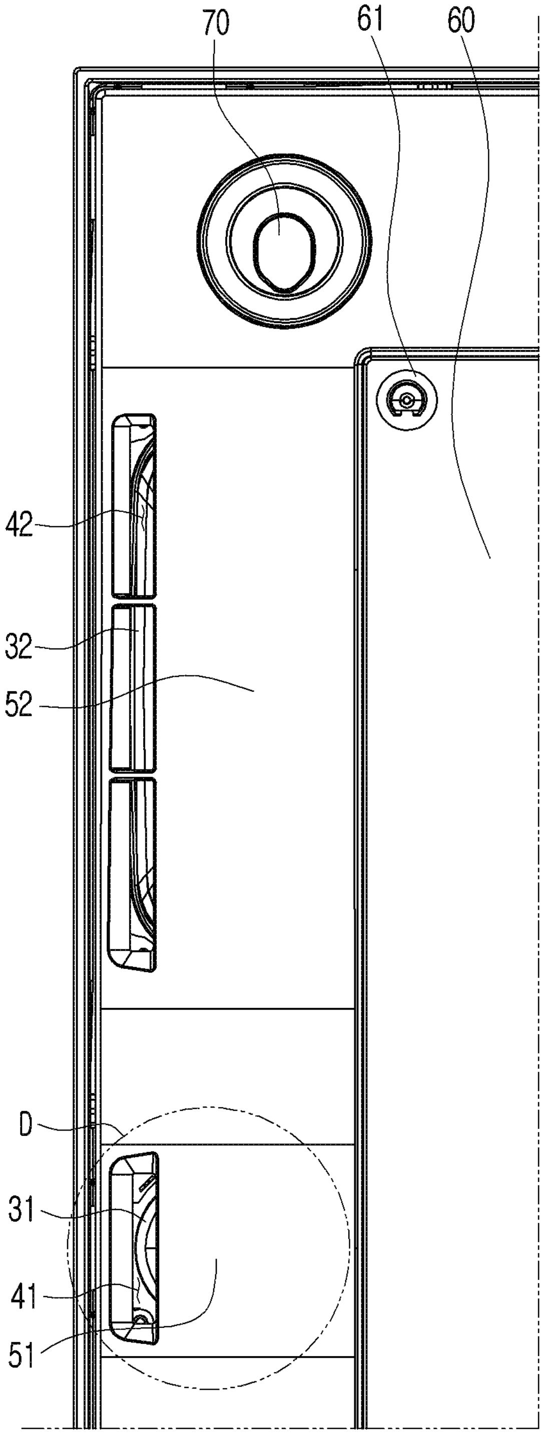
FIG. 5 is a view enlarging a part 'C' of FIG. 4.
Figure 6:
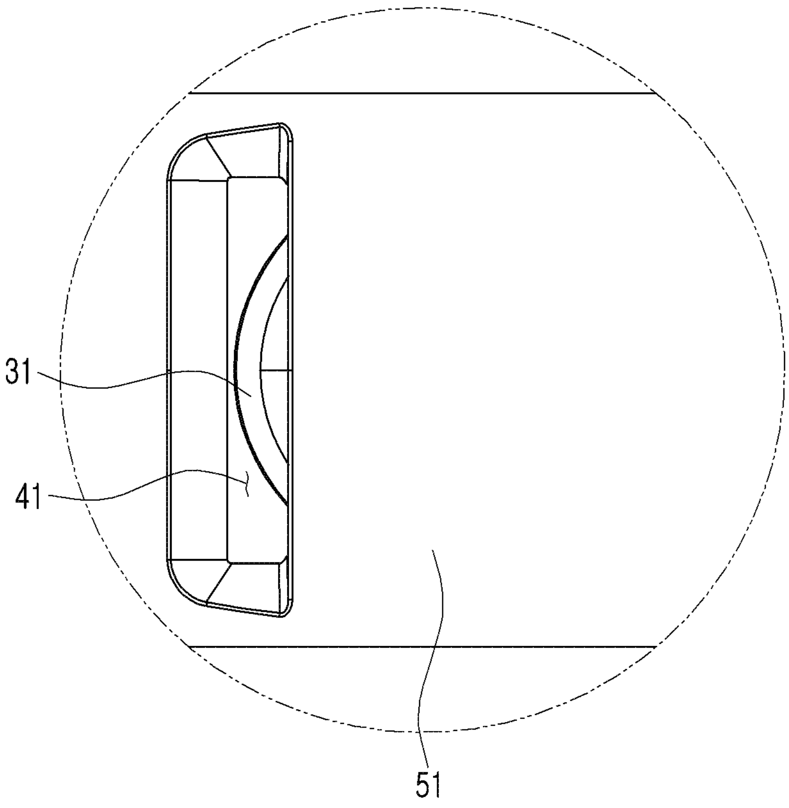
FIG. 6 is a view enlarging a part 'D' of FIG. 5.

FIG. 5 is a view enlarging a part 'C' of FIG. 4, and FIG. 6 is a view enlarging a part 'D' of FIG. 5.

According to an embodiment of the disclosure, the first speaker unit 31 may be circular and the second speaker unit 32 may be oval such that a height of the second speaker unit 32 is longer than a width of the second speaker unit 32.

Meanwhile, the disclosure is not limited thereto, and they may have various shapes such as a square shape and a polygonal shape.

Through the first and the second speaker units 31 and 32, sound may occur by converting an electric signal to an acoustic signal. An inside configuration of the first and second speaker units 31, 32 may be used in various types such as a tweeter, a woofer, a mid-range speaker, and a full-range speaker according to a frequency domain of the acoustic signal.

Here, the woofer is a speaker specific to sound of a low frequency such as a base sound, a mid-range speaker is a speaker specific to an intermediate frequency band, and the tweeter is a speaker specific to sound of a high frequency. Also, the full-range speaker is a speaker designed to cover all ranges from a low frequency to a high frequency.

The plate film 60 may be provided to protect inner electronic parts in an inner center area other than the exposure area 100 in the housing 10. Electronic parts inside the speaker may be configured of a battery, a transducer, or the like.

With reference to FIGS. 4 and 5, the plate film 60 may have a square shape.

Meanwhile, the disclosure is not limited thereto and it may have various shapes such as a circular shape and a polygonal shape.

In FIG. 5, the fixing member 61 may be positioned between the housing 10 and the plate film 60 to fix the plate film 60 to the housing 10.

FIG. 5 illustrates only part, but the fixing member 61 may be disposed at each edge of the front surface of the plate film 60.

The fixing member 61 may be configured of a screw bolt, a screw, or the like in a threaded fastening form.

In FIG. 6, the slot loading loudspeaker has a structure where the transducer is embedded in an enclosure.

The transducer (not shown) is disposed inside the first speaker unit 31 and the enclosure may include the first opening 41, the first cover 51, or the like.

The transducer (not shown) generates an acoustic signal by vibration of a diaphragm. The transducer (not shown) may convert an acoustic signal to an electric signal and may generate an acoustic signal of various ranges of sound from a range of sound of a low frequency to a range of sound of a high frequency.

In FIG. 6, the first cover 51 has a net shape. The first cover 51 may be disposed at a certain distance on a front surface of the first speaker unit 31. When vertically viewed from the top to the bottom, a center part of the net of the first cover 51 may correspond to a center part of the first speaker unit 31.

In FIG. 6, the first opening 41 may be disposed next to the first cover 51.

In FIG. 6, the first opening 41 may have a shape exposing part of the first speaker unit 31. Meanwhile, the disclosure is not limited thereto and a section of the first opening 41 may have various shapes such as a rectangular shape, an oval shape, and a circular shape.

FIGS. 7 to 12 are views illustrating part of a section cut along an axis A-A' of FIG. 1. In FIGS. 7 to 12, the speaker apparatus 1 may be configured of the panel member 20, the first speaker unit 31, the first opening 41, the first cover 51, the blocking member 90, the plate film 60, the fastening part 70, and a support (not shown).

Specifically, in FIGS. 7 to 12, the first slot loading cover 51 is disposed at an outside of the plate film 60, the first speaker unit 31 is disposed at a rear side of the first slot loading cover 51, and the panel member 20 is disposed at a front side of the plate film 60. As shown in FIGS. 7 to 12, a gap 2 is formed between the first cover 51 and the panel member 20.

In FIGS. 7 to 12, the support (not shown) may take a supporting role in order that components of each electronic device are disposed to measure up to a standard and are not shaken.

A material of the support (not shown) may be configured through various materials such as plastic, metal, ceramic, and a composite material.

The enclosure may be configured through the first cover 51 on the front surface of the first speaker unit 31, the support (not shown) supporting the rear surface of the first speaker unit 31, or the like.

In FIGS. 7 to 12, it is illustrated that sections of the first cover 51 and the blocking members 90, 91, 92 are convex, but the disclosure is not limited thereto, wherein the sections may have not only a semicircular shape but also a rectangular shape, a trapezoidal shape, or the like.

In FIGS. 7 to 12, the first cover 51 and the blocking members 90, 91, 92 may further include an auxiliary member (not shown).

In FIGS. 7 to 12, according to an embodiment of the disclosure, the auxiliary member (not shown) may be an acoustic meta material (AMM). In FIGS. 7 to 12 according to an embodiment of the disclosure, the auxiliary member (not shown) may cover all of the surface of the covers 51, 52 and the rear surface of the panel member 20 and may cover only part of them.

Figure 7:
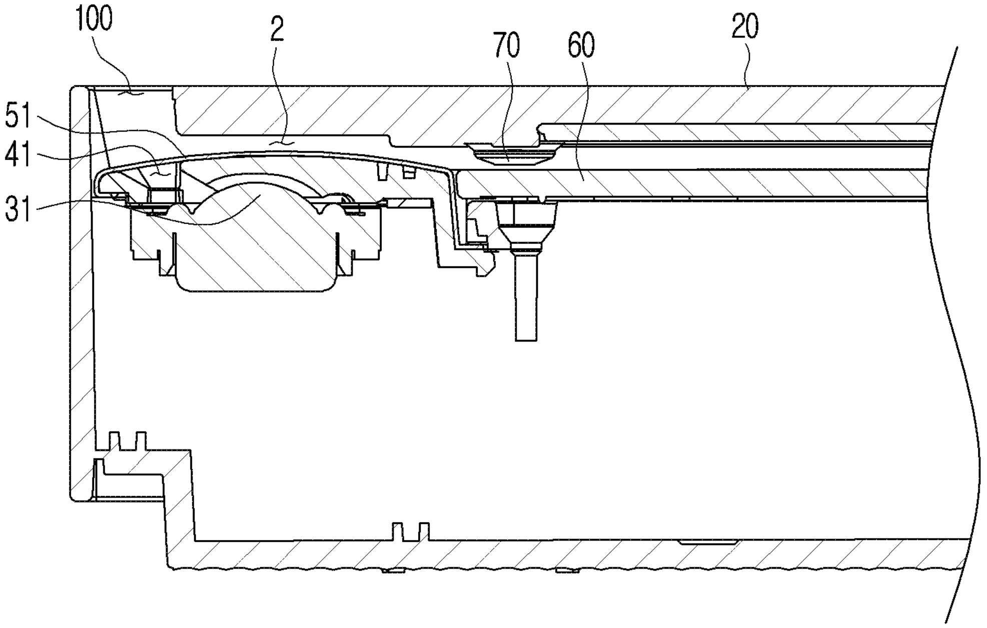
FIGS. 7 to 12 are sectional views of cutting FIG. 1 in a criterion of A-A'.

In FIG. 7, according to an embodiment of the disclosure, the blocking member may be present on the surface of the first cover 51.

Also, the blocking member may be integrated with the first cover 51 in the same material.

In FIG. 7, according to an embodiment of the disclosure, the blocking member may be present on the surface of the second cover 52.

Also, the blocking member may be the same material as that of the second cover 52 and may be integrated with the second cover 52.

Due to the inclusion of this blocking member, a protruding form is generated and thus the gap 2 is changed. As an example, if the gap 2 is formed to be lengthly elongated to an inside of the housing 10, a size of the gap 2 may be implemented to be a gradually narrower form as the gap is away from a position close to the slot. If the size of the gap 2 is reduced, the acoustic signal inserted into the gap 2 may not be deeply inserted and is directly reflected and exits and thus a degree of construction/destruction may not become large.

Conventionally, the panel member 20 and the first cover 51 may have a flat structure, the gap 2 having a certain size or more is generated between the panel member 20 and the first cover 51, and thus resonance occurs at a specific frequency due to this gap 2. This resonance results in a sudden peak at the specific frequency and as a result, energy is unbalanced and a dip occurs. Here, the peak refers to a point where a specific frequency is more largely outputted compared to other frequencies in a frequency response curve due to a design of a speaker, a characteristic of the enclosure, an environmental element, or the like and the dip refers to a point where an output of the specific frequency is reduced in the frequency response curve due to the design of the speaker, the characteristic of the enclosure, the environmental element, or the like.

Here, it is possible to compensate for the peak through signal processing but it is difficult to compensate for the dip and thus a separate tweeter is needed. This structural problem is a main reason increasing a production cost of the electronic device including a slot loading loudspeaker (SLL).

The surface of the first cover 51 protrudes to be convex in a direction of the panel member 20 due to the inclusion of the blocking member, thereby reducing the gap 2 between the panel member 20 and the first cover 51. As the gap 2 is reduced, the acoustic signal emitted from the first speaker unit 31 is radiated through the gap between the first cover 51 and the panel member 20, thereby reducing reflected indirect radiation acoustic signal. As the indirect radiation acoustic signal is reduced, constructive and/or destructive interference with the direct radiation acoustic signal may be reduced and sound quality of the speaker apparatus 1 may be improved. Also, since there is no need to dispose a separate tweeter, the production cost of the electronic device may be reduced.

This is not limited to only the first cover 51, and may be also applied to the second cover 52 in the same way. Specifically, the surface of the second cover 52 protrudes to be convex in a direction of the panel member 20 due to the inclusion of the blocking member, thereby reducing the gap 2 between the panel member 20 and the second cover 52.

Figure 8:
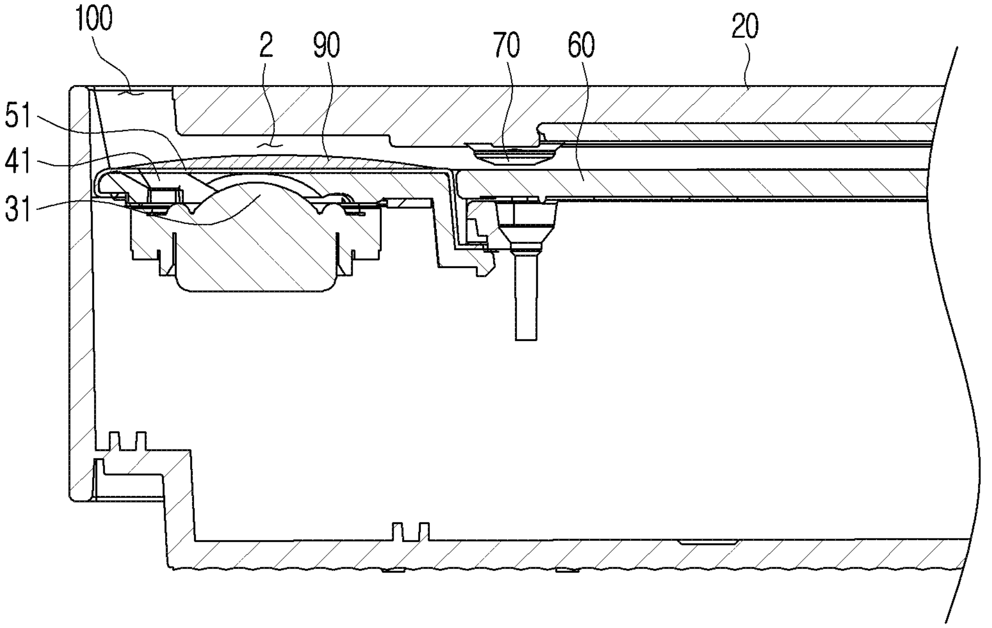

In FIG. 8, according to an embodiment of the disclosure, a surface of the first cover 51 in the speaker apparatus 1 has a flat form and the blocking member 90 may be further included on the front surface of the first cover 51.

The blocking member 90 may be a different material from that of the first cover 51.

For example, a material of the blocking member 90 may be a polyester fiber, a compressed fiber, polyurethane foam, fiberglass, cellulose, a cotton fiber, or the like.

The blocking member 90 may absorb an acoustic signal emitted from each speaker unit 31, 41 and may prevent the acoustic signal emitted from each speaker unit 31, 41 from penetrating a center part of the housing 10. In FIG. 8, the blocking member 90 present on a surface of the covers 51, 52 and provided in a form protruding in a direction of the panel member 20 may contact and may not contact the panel member 20.

Figure 9:
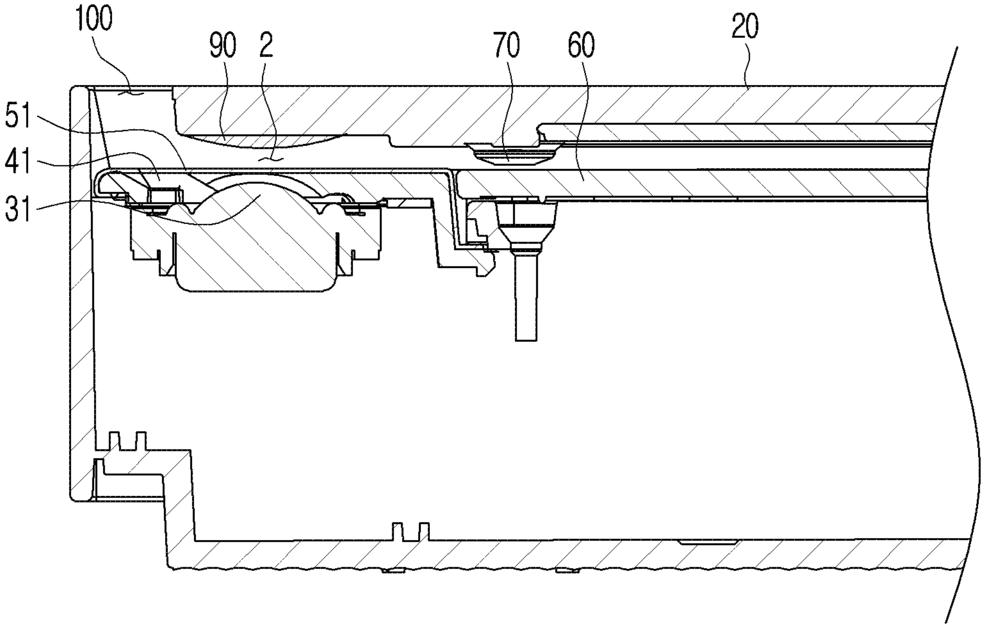

In FIG. 9, according to an embodiment of the disclosure, a surface of the first cover 51 in the speaker apparatus 1 has a flat form and the rear surface of the panel member 20 may be provided in a form protruding to be convex due to the inclusion of the blocking member 90 in a direction of the first cover 51. As the rear surface of the panel member 20 protrudes, a size of the gap may be varied according a distance in the same method as that of FIG. 7.

In FIG. 9, the blocking member 90 may be manufactured to be integrated with the panel member 20 in the same material and may be manufactured in a different material on the rear surface of the panel member 20.

For example, a material of the blocking member 90 may be a polyester fiber, a compressed fiber, polyurethane foam, a fiberglass, cellulose, a cotton fiber, or the like.

The blocking member 90 may absorb the acoustic signal emitted from each speaker unit 31, 41 and prevent the acoustic signal emitted from each speaker unit 31, 41 from penetrating the center part of the housing 10.

According to an embodiment of the disclosure, the blocking member 90 may be provided in a form protruding to be convex. Meanwhile, the disclosure is not limited thereto and it may have various shapes in which the vertically cut section may have various shapes such as a square shape, a trapezoidal shape, or the like.

In FIG. 9, the blocking member 90 present on the rear surface of the panel member 20 and provided in a form protruding in a direction of the covers 51, 52 may contact and may not contact the covers 51, 52.

Figure 10:
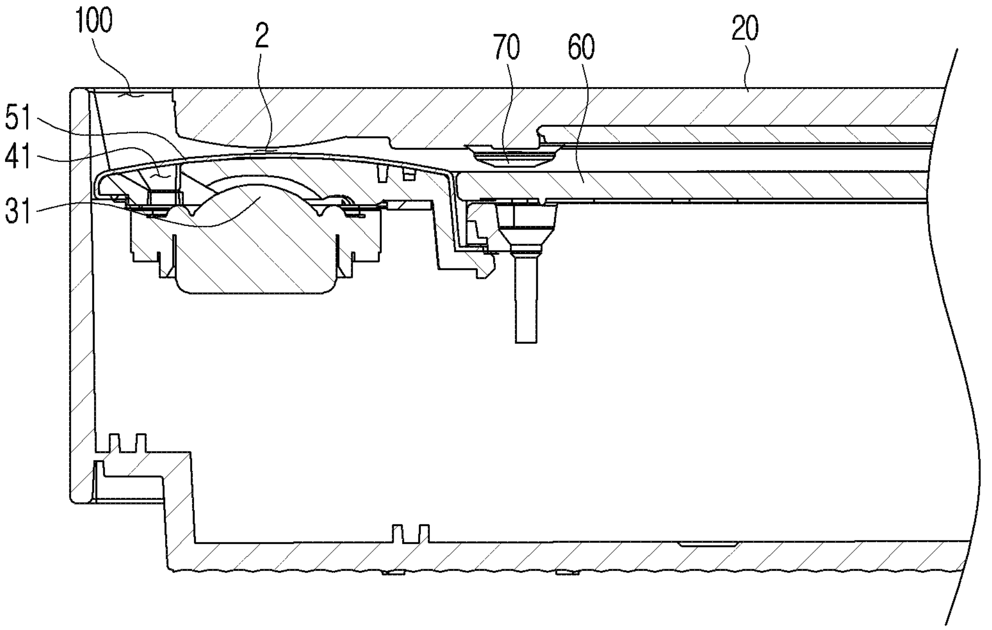

In FIG. 10, according to an embodiment of the disclosure, the surface of the first cover 51 is provided in a form protruding to be convex in the direction of the panel member 20 due to the inclusion of the blocking member and the rear surface of the panel member 20 may be provided in a form protruding to be convex in a direction of the first cover 51 due to the inclusion of the blocking member.

In FIG. 10, according to an embodiment of the disclosure, the blocking member present in the first cover 51 may be integrated with the first cover 51 and the blocking member present in the panel member 20 may be integrated with the panel member 20 and may be the same material as that of the panel member.

Meanwhile, the disclosure is not limited thereto, and materials of a blocking member present in the first cover 51 and a blocking member present in the panel member 20 may be a different material from those of the first cover 51 and the panel member 20, respectively.

Figure 11:
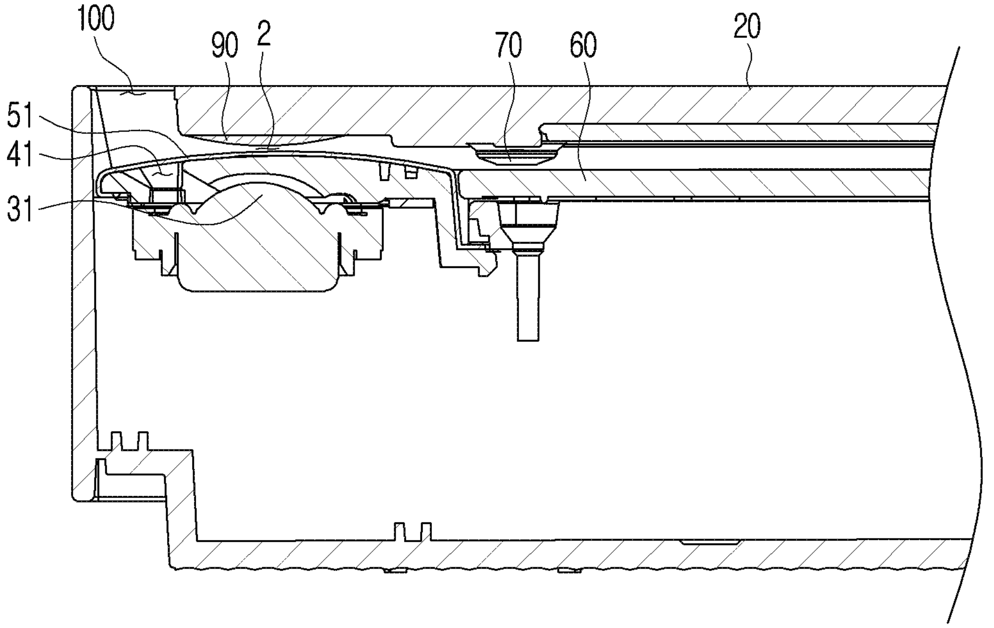

In FIG. 11, according to an embodiment of the disclosure, the surface of the first cover 51 may protrude to be convex in the direction of the panel member 20 due to the inclusion of the blocking member and the blocking member 90 disposed on the rear surface of the panel member 20 may protrude to be convex in a direction of the first cover 51.

In FIG. 11, all of the blocking member present on the surface of the first cover 51 and the blocking member 90 disposed on the rear surface of the panel member 20 protrude to be convex, thereby more reducing the gap 2 between the housing 10 and the panel member 20 or making propagation of the acoustic signal difficult.

In FIG. 11, the surface of the first cover 51 and the blocking member 90 disposed on the rear part of the panel member 20 do not contact each other and are disposed in a spaced state.

In FIG. 11, the blocking member present on the surface of the covers 51, 52 may contact and may not contact the blocking member 90 present on the rear surface of the panel member 20.

In FIG. 11, the blocking member 90 may be an absorbing material.

In FIG. 11, the absorbing material may be an acoustic meta material (AMM).

Figure 12:
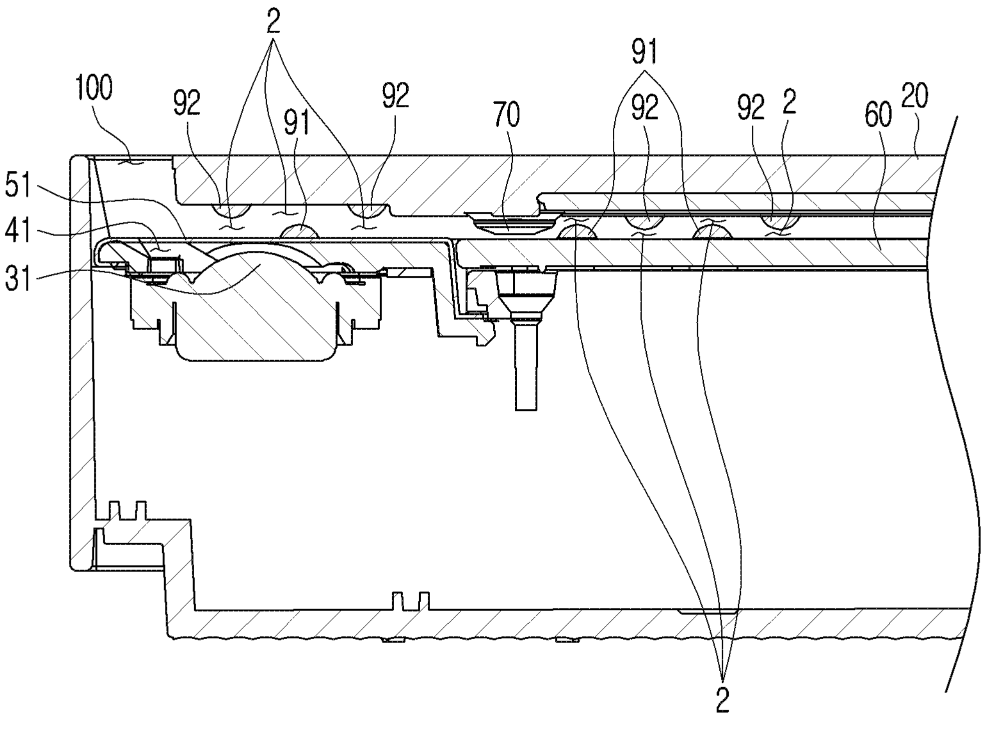

In FIG. 12, the speaker apparatus 1 may include at least one first blocking member 91 on the front surface of the plate film 60 and may include at least one second blocking member 92 on the rear surface of the panel member 20.

In FIG. 12, according to an embodiment of the disclosure, the first blocking member 91 and the second blocking member 92 may be disposed to be spaced apart from each other. Differently, a form thereof may be described as a bended form and a meander form.

Specifically, a plurality of first blocking members 91 are disposed on the front surface of the plate film 60, the front surface of the first cover 51 and a plurality of second blocking members 92 are disposed on the rear surface of the panel member 20, and thus a path having a meander form may be formed by a plurality of protruding protrusions.

In FIG. 12, according to an embodiment, a size, a shape, or the like of the section of the gap 2 between the housing 10 and the panel member 20 may be varied according to a position by the first blocking member 91 and/or the second blocking member 92.

According to an embodiment of the disclosure, at least one of the first blocking member 91 or the second blocking member 92 may be an absorbing material.

A material of the absorbing material may be a polyester fiber, a compressed fiber, polyurethane foam, fiberglass, cellulose, a cotton fiber, or the like.

In FIG. 12, the absorbing material may absorb an indirectly radiated acoustic signal and may prevent interference with the acoustic signal directly radiated from the first and second speaker units 31, 32.

In FIG. 12 according to another embodiment of the disclosure, one of the first blocking member 91 and the second blocking member 92 is an absorbing material and the other one may be the same material as that of the panel member 20 and/or the first cover 51.

In FIG. 12, the blocking member 91 present on the surface of the covers 51, 52 may contact and may not contact the blocking member 92 present in the panel member 20 or on the rear surface of the panel member 20.

In FIG. 12, the blocking member 92 present on the rear surface of the panel member 20 may contact and may not contact the blocking member 92 or the plate film 60 present in the covers 51, 52 or on the surface of the covers 51, 52.

Figure 13:
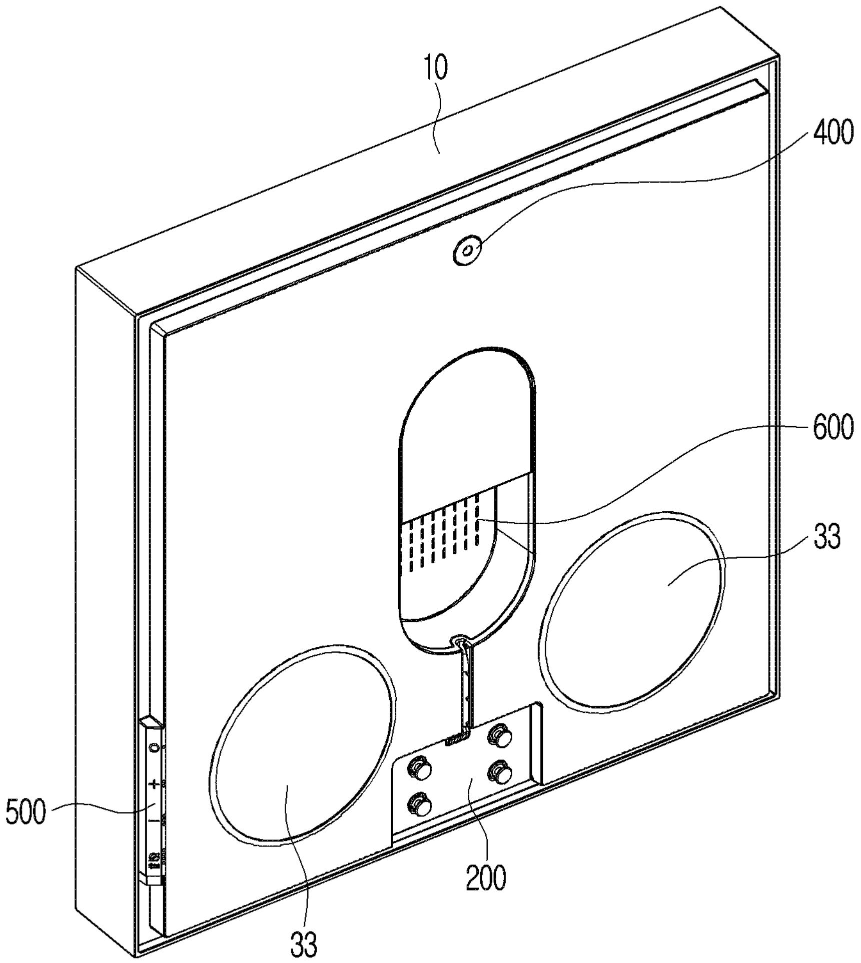
FIG. 13 is a rear perspective view of a speaker apparatus according to at least one embodiment of the disclosure.

FIG. 13 is a rear perspective view illustrating a rear surface of the speaker apparatus 1.

In FIG. 13, two third speaker units 33 are disposed on the rear surface of the housing 10.

The expression of the third speaker unit 33 may be differently expressed as a rear speaker unit.

Two third speaker units 33 may be symmetrically disposed in a criterion of the center part.

According to an embodiment of the disclosure, the third speaker unit 33 is larger than the first speaker unit 31 and the second speaker unit 32, wherein its size may be 5 inches.

The third speaker unit 33 may emit the acoustic signal in the rear direction of the housing 10 and thus together with the speaker unit disposed in the front direction, abundant sound may be provided.

The third speaker unit 33 may be used in various types such as a tweeter, a woofer, a mid-range speaker, and a full-range speaker according to a frequency domain.

If many speaker units (the first speaker unit 31, the second speaker unit 32, and/or the third speaker unit 33) are used, every speaker unit may separate and replay many frequency domains (a high frequency to a low frequency).

Through the above, each speaker unit may be optimized in a specific frequency range and may make clearer and more exact sound. Also, distortion of sound may be reduced and sound quality may be enhanced.

Also, if many speaker units (the first speaker unit 31, the second speaker unit 32, and/or the third speaker unit 33) are used, durability may be enhanced.

Specifically, each speaker unit 31, 32, 33 does not take charge of all frequency bands and thus a burden loaded on one unit is reduced and the entire lifetime of a system may be extended.

Also, if many speaker units (the first speaker unit 31, the second speaker unit 32, and/or the third speaker unit 33) are used, there may be an individual tuning function.

Specifically, each of many speaker units (the first speaker unit 31, the second speaker unit 32, and/or the third speaker unit 33) may separately adjust high, middle, and low pitched sound, thereby reinforcing or reducing a specific frequency band. Through the above, sound may be optimized to measure up to various environments.

According to an embodiment of the disclosure, the first speaker unit 31 may be a tweeter taking charge of a range of sound of a high frequency, the second speaker unit 32 is a mid-range speaker taking charge of a range of sound of an intermediate frequency, and the third speaker unit 33 may be a woofer taking charge of a range of sound of a low frequency.

The housing 10 may be hung up on a structure such as a wall, a partition, or the like through a hole part 400.

In FIG. 13, an operation part 500 may be disposed on a lower part of a left side and/or a right side of the housing 10.

In FIG. 13, the operation part 500 may include a button for controlling volume of the speaker apparatus 1, a power button, other various buttons, or the like.

In FIG. 13, the operation part 500 may further include a LED.

In FIG. 13, a discharging part 600 may be installed on a center part of the housing 10. The discharging part 600 is a component for emitting inner heat of the speaker apparatus 1.

The discharging part 600 may have a net form.

The discharging part 600 may lower an inside temperature if the speaker apparatus 1 operates for a long time.

A support 200 may be disposed on a lower part of a rear surface of the speaker apparatus 1.

According to an embodiment of the disclosure, a support plate (not shown) may be fixed to the support 200. Through the above, the speaker apparatus 1 may be disposed on various bottoms such as a desk.

Each speaker unit in the sparker apparatus 1 includes a slot outputting an acoustic signal through the exposure area 100. If the user is in front of the speaker unit 1, the slot may be exposed to the user's view and appearance may not be good. Also, a foreign material may flow into the inside of the speaker unit through the slot. To prevent the above, a mesh cover for covering the exposed area 100 overall may be further included. The mesh cover may be made of a fabric material but it is not limited thereto and may be made in various materials such as a metal material and a plastic material.

Each of components described in the disclosure may be configured as one or more components and the name of the relevant component may be varied according to a type of an electronic device.

As above, each of various embodiments of the disclosure is individually described but each embodiment is not necessarily implemented solely and a configuration and an operation of each embodiment may be implemented in combination with at least one other embodiment.

Also, as the above, various examples of the present disclosure are shown and described. However, it is obvious that the disclosure is not limited to the aforementioned specific examples and various modifications may be implemented by those skilled in the art without deviating from the gist of the disclosure claimed in the scope of claims. Further, these modifications should not be independently understood from the technical spirit or prospect of the disclosure.

What is claimed is:

1. A speaker apparatus, comprising:

a housing;

a slot loading loudspeaker disposed inside the housing, the slot loading loudspeaker including:

a speaker unit, and a cover covering the speaker unit, and including an opening through which an acoustic signal generated from the speaker unit may be output; and a panel member disposed in a forward direction of the slot loading loudspeaker so that:

a gap is formed between the cover and the panel member, and an exposure area is formed between an edge of the housing and an edge of the panel member to expose the opening through the exposure area so that an acoustic signal outputted through the opening is transferred to an outside, wherein at least one of the cover or the panel member includes at least one blocking member for preventing at least a portion of the acoustic signal outputted through the opening from flowing into an inside of the gap.

2. The speaker apparatus of claim 1, wherein the at least one blocking member is a protruding portion of a surface of, and formed of a same material as, the cover, or the at least one blocking member protrudes from the surface of, and is formed of a different material from, the cover.

3. The speaker apparatus of claim 1, wherein the at least one blocking member protrudes in a direction of the panel member, and the at least one blocking member does not contact the panel member.

4. The speaker apparatus of claim 1, wherein the at least one blocking member is a protruding portion of a rear surface of, and formed of a same material as, the panel member, or the at least one blocking member protrudes from the rear surface of, and is formed of a different material from, the panel member.

5. The speaker apparatus of claim 1, wherein the at least one blocking member is disposed on a rear surface of the panel member, and protrudes in a direction of the cover, and the at least one blocking member does not contact the cover.

6. The speaker apparatus of claim 1, further comprising:

an auxiliary member in a space between the cover and the panel member.

7. The speaker apparatus of claim 6, wherein the auxiliary member is an acoustic meta material (AMM).

8. The speaker apparatus of claim 1, wherein the at least one blocking member includes a first blocking member disposed on all of a surface of the cover, and a second blocking member disposed on all of a rear surface of the panel member, the first blocking member is formed of a different material from, or a same material integrated with, the cover, and the second blocking member is formed of a different material from, or a same material integrated with, the panel member.

9. The speaker apparatus of claim 1, wherein the at least one blocking member includes a first blocking member protruding from a front surface of the cover, and a second blocking member protruding from a rear surface of the panel member, and the first blocking member does not contact the second blocking member.

10. The speaker apparatus of claim 9, further comprising:

an auxiliary member between the first blocking member and the second blocking member.

11. The speaker apparatus of claim 10, wherein the auxiliary member is an acoustic meta material (AMM).

12. The speaker apparatus of claim 1, wherein the at least one blocking member includes a plurality of blocking members disposed on at least one of a front surface of the housing or a rear surface of the panel member.

13. The speaker apparatus of claim 1, further comprising:

an auxiliary member disposed on a front surface of the cover and a rear surface of the panel member.

14. The speaker apparatus of claim 1, wherein the at least one blocking member has a convex dome shape.

15. The speaker apparatus of claim 1, further comprising:

an auxiliary speaker unit and a rear speaker unit, wherein the auxiliary speaker unit is disposed at both sides of a front of the housing, and the rear speaker unit is disposed on a rear surface of the housing so as to be symmetrical about a center line of the rear surface of the housing.

* * * * *